United States Patent [19]

Wallon et al.

[11] Patent Number: 5,470,907
[45] Date of Patent: Nov. 28, 1995

[54] AQUEOUS POLYURETHANE DISPERSIONS

[75] Inventors: Alexander Wallon, Limburgerhof; Gerhard Auchter, Bad Duerkheim; Ulrike Licht, Mannheim; Karl Haeberle, Speyer; Angelika Funhoff, Heidelberg, all of Germany

[73] Assignee: BASF Aktiengesellschaft, Ludwigshafen, Germany

[21] Appl. No.: 263,233

[22] Filed: Jun. 21, 1994

[30] Foreign Application Priority Data

Jun. 21, 1993 [DE] Germany .......................... 43 20 455.4

[51] Int. Cl.$^6$ .................. C08J 3/00; C08K 3/20; C08L 75/00; C08F 283/04
[52] U.S. Cl. .............. 524/507; 524/591; 524/839; 524/840; 525/455
[58] Field of Search .................... 524/591, 839, 524/840, 507; 525/455

[56] References Cited

U.S. PATENT DOCUMENTS

| | | | |
|---|---|---|---|
| 3,491,051 | 1/1970 | Elkin et al. | 524/507 |
| 5,169,895 | 12/1992 | Coogan et al. | 524/591 |
| 5,231,130 | 7/1993 | Wallon et al. | 524/840 |

FOREIGN PATENT DOCUMENTS

| | | |
|---|---|---|
| 1495745 | 6/1978 | Germany. |
| 3903538 | 8/1990 | Germany. |
| 4024567 | 2/1992 | Germany. |
| 4137661 | 5/1993 | Germany. |

OTHER PUBLICATIONS

Ullmanns Encylkopadie der technischen Chemie, 4th Edition, Verlag Chemie (Weinheim), vol. 19, p. 5, 1980.
Ullmanns Encyklopadie der technischen Chemie, Verlage Chemie (Weinheim), vol. 22, pp. 586–587, 1982.

*Primary Examiner*—Paul R. Michl
*Assistant Examiner*—Patrick Niland
*Attorney, Agent, or Firm*—Oblon, Spivak, McClelland, Maier & Neustadt

[57] ABSTRACT

Aqueous polyurethane dispersions contain, at a pH of the dispersing medium of ≧6, an anionically stabilized polyurethane present in disperse form as well as an added polymer having acidic functions and intended for reducing the flow resistance.

10 Claims, No Drawings

AQUEOUS POLYURETHANE DISPERSIONS

The present invention relates to aqueous polyurethane dispersions containing

A) at least one polyurethane (component A) dispersed in an aqueous medium and having negatively charged groups at a pH of the aqueous dispersing medium of $\geq 6$, as the main component, and B) effective amounts, based on component A, of at least one polymer (component B) which comprises, in polymerized form, a) from 25 to 100% by weight of at least one unsaturated monomer which has at least one acid group of the Brönsted type (monomers Ba) and b) from 0 to 75% by weight of one or more monomers capable of undergoing free radical copolymerization (monomers Bb), with the proviso that component B has a relative number average molecular weight of from 1,000 to 50,000, component B acts as a Brönsted acid when added to water at 25° C. and the aqueous dispersing medium of the aqueous polyurethane dispersion has a pH of a $\geq 6$ at 25° C.

The relative number average molecular weight $\overline{M}_n$ of component B is preferably from 2,000 to 20,000, very particularly preferably from 2,000 to 10,000. Other advantageous components B are those whose ratio of relative weight average molecular weight $\overline{M}_w$ to $\overline{M}_n$, ie. $\overline{M}_w/\overline{M}_n$, is 1.5–3.5. In this publication, the stated molecular weights for component B relate to determinations by means of gel permeation chromatography.

Aqueous polyurethane dispersions are generally known. They are used, for example, as finishes, binders or adhesives. As a rule, they are kept in dispersion with the cooperation of ionic charges, ie. the polyurethane itself carries positive or negative charges and the repulsion of charges of the same sign prevents coagulation of the dispersion. Of course, external dispersants, such as protective colloids and/or emulsifiers, may also be present in addition to these internal-dispersants. However, their presence is not essential (cf. for example DE-A 39 03 538, DE-A1 495 745 and DE-A 40 24 567) and not preferred. The disadvantage of such aqueous polyurethane dispersions stabilized with the cooperation of internal charges is, however, that they have a high dynamic viscosity and high flow resistance owing to the interaction of charges of the same sign (cf. for example the prior Application DE-A 41 37 661=O.Z. 0050/42811).

It is an object of the present invention to provide aqueous polyurethane dispersions whose disperse polyurethane distribution on the one hand is stabilized with the cooperation of negative charges present on the polyurethane but, on the other hand, which have reduced flow resistance and a lowest dynamic viscosity in conjunction with essentially unchanged performance characteristics.

We have found that this object is achieved by the aqueous polyurethane dispersions defined at the outset.

The effect of component B with regard to reducing the dynamic viscosity is surprising, but it is generally known that polymers which contain, as polymerized units, a large amount of monomers having acidic functions, in particular in an aqueous medium having a high pH, have a thickening effect, ie. increase the flow resistance (cf. for example Ullmanns Encyklopädie der technischen Chemie, 4th Edition, Verlag Chemie (Weinheim), Vol. 19 (1980), page 5, and Vol. 22 (1982), pages 586 and 587, and DE-A 24 01 163 and WO 88/08858). Evidently, a limited average molecular weight of component B is essential for the novel effect of said component.

Remarkably, the presence of component B reduces not only the dynamic viscosity of the aqueous polyurethane dispersion (independently of the shear gradient) but simultaneously reduces its tendency towards structurally viscous behavior, ie. the tendency toward Newtonian behavior, where the dynamic viscosity is independent of the shear stress, increases.

The novel aqueous polyurethane dispersions display their properties which are advantageous according to the invention in a particularly striking manner when their content of disperse polyurethane is from 20 to 80, preferably from 40 to 60, % by weight, based on the dispersion.

Furthermore, the pH of their aqueous dispersing medium at 25° C. is advantageously from 6 to 11, preferably from 7 to 9.

As a rule, component A essentially comprises a) at least one organic diisocyanate or at least one mixture of organic isocyanates which has an arithmetic mean NCO functionality of from 1.9 to 2.3 [monomers Aa], b) at least one compound which has at least one anionic group and furthermore possesses at least one alcoholic OH group or thiolic SH group or

group or a mixture of these groups [monomers Ab], c) at least one dihydric alcohol which differs from the monomers Ab and has a number average relative molecular weight of from more than 500 to 5,000 or at least one mixture of alcohols differing from the monomers Ab, which mixture has an arithmetic mean functionality of from 1.5 to 2.5, based on alcoholic OH groups, and possesses a number average relative molecular weight of from more than 500 to 5,000 [monomers Ac] and, if desired, d) one or more of the compounds which differ from the monomers Ab and have: two functional groups from the amount comprising the alcoholic OH group, the thiolic SH group and the

group and possess a number average relative molecular weight of from 60 to 500, or, if desired, a mixture of compounds differing from the monomers Ab, which mixture has an arithmetic mean functionality of from 1.5 to 2.5, based on functional groups from the amount comprising the alcoholic OH group, the thiolic SH group and the

group, and possesses a number average molecular weight of from 60 to 500 [monomers Ad].

Component A is preferably exclusively composed of the monomers Aa to Ad. Particularly suitable monomers Aa are aliphatic, cycloaliphatic, araliphatic and aromatic diisocyanates, such as tetramethylene diisocyanate, hexamethylene diisocyanate, dodecamethylene diisocyanate, trimethylhexamethylene diisocyanates, such as 2,2,4- and 2,4,4-trimethylhexamethylene diisocyanate, cyclohexyl diisocyanates, such as 1,4-diisocyanatocyclohexane, methylcyclohexyl diisocyanates, 1-isocyanato-3,3,5-trimethyl- 5-isocyanatomethylcyclohexane (isophorone diisocyanate), 4,4'-diisocyanatodiphenylmethane, 2,4- and 2,6-diisocyanatotoluene, 4,4'-di-(isocyanatocyclohexyl)methane, tetramethylxylylene diisocyanate, 1,4-diisocyanatobenzene, p-xylylene diisocyanate, isopropenyldimethyltoluylene diisocyanate and tetramethylxylylene diisocyanate, and polyisocyanates derived therefrom and containing carbodiimide, allophanate, isocyanurate, urethane or biuret groups. Other suitable monomers Aa are monoisocyanates, such as phenyl isocyanate, cyclohexyl isocyanate or n-dodecyl isocyanate. The monoisocyanates are usually present only in minor amounts, for molecular weight regulation. Preferably used monomers Aa are compounds of the general formula X(NCO)$_2$, where X is an aliphatic hydrocarbon radical of 4 to 12 carbon atoms, or a cycloaliphatic or aromatic hydrocarbon radical of 6 to 15 carbon atoms. Mixtures of the monomers Aa may of course also be used. Mixtures of aliphatic or cycloaliphatic diisocyanates with aromatic diisocyanates in a molar ratio of from 1:4 to 5:1 have proven particularly suitable.

If monoisocyanates are present as the monomers Aa, their amount is preferably such that they contribute not more than 10 mol% of isocyanate groups to the total amount of isocyanate groups within the total amount of monomers Aa used. The monomers Aa advantageously have an average NCO functionality of 2. Monomer mixtures Aa which are composed exclusively of diisocyanates are particularly advantageous.

Anionic groups of the monomers Ab are considered to be those groups which, as such or after suitable modification, for example by neutralization, are present in partially or completely ionized form in an aqueous medium, the negative charge remaining on the remainder of the monomer Ab which carries the one or more alcoholic OH, thiolic SH and/or

groups reactive with the isocyanate groups.

Alcoholic —OH and thiolic —SH groups are to be excepted from the definition of the anionic groups. Examples of anionic groups are acid functions, such as carboxyl, sulfo or phosphonyl groups which may be additionally modified by neutralization with bases. Inorganic or organic bases, such as alkali metal hydroxides, alkali metal carbonates, alkali metal bicarbonates, ammonia or primary, secondary and preferably tertiary amines, eg. triethylamine, dimethylaminoethanol or dimethylaminopropanol, are suitable for modifying anionic groups by neutralization.

Particularly suitable monomers Ab are, for example, aliphatic, cycloaliphatic or aromatic mono- or dihydroxycarboxylic acids. Dihydroxyalkanecarboxylic acids, especially of 3 to 10 carbon atoms, as also described in U.S. Pat. No. 3,412,054, are preferred. Compounds of the general formula

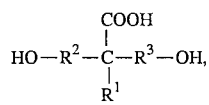

where $R^1$ is hydrogen or alkyl of 1 to 4 carbon atoms and $R^2$ and $R^3$ are each $C_1$-$C_4$-alkylene, are particularly preferred. An example is 2,2-dimethylolpropionic acid. Diaminosulfonic acids, such as N-(2-amminoethyl)-2-aminoethanesulfonic acid, dihydroxyphosphonates, such as ethyl 2,3-dihydroxypropanephosphonate, or the corresponding unesterified phosphonic acid, dihydroxysulfonic acids, diaminocarboxylic acids, such as lysine or β-alanine, and N-(2-aminoethyl)-2-aminoethanecarboxylic acid and the adducts, stated in DE-A 20 34 479, of aliphatic diprimary diamines with α,β-monoethylenically unsaturated carboxylic acids or salts thereof, for example the adduct of ethylenediamine with the sodium salt of acrylic acid, are also noteworthy.

The neutralization of the anionic groups can be carried out before, during or, preferably, after the isocyanate polyaddition reaction.

The arithmetic mean functionality with respect to those functional groups of the monomers Ab which are reactive with isocyanate is usually from 1.5 to 2.5.

As a rule, the ratio of the number of equivalents of

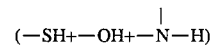

to the number of equivalents of NCO for the incorporated monomers Ab/monomers Aa is from 0.03 to 0.5, preferably from 0.05 to 0.4. A good dispersing effect is obtained when from 0.05 to 2, preferably from 0.1 to 0.5, mmol of the anionic groups of the incorporated monomers Ab are present in ionized form in the novel aqueous polyurethane dispersion per gram of polyurethane A.

Particularly suitable monomers Ac are the known polyesters, polyethers, polythioethers, polyacetones, polyacetals, polycarbonates and polyesteramides having at least 2 hydroxyl groups. Preferred monomers Ac are those whose relative molecular weight is from 750 to 3,000. Diols are also preferred as monomers Ac.

Suitable polyesterpolyols are in particular the reaction products, known per se, of polyhydric alcohols with polybasic carboxylic acids, the alcoholic component being used in excess. The polybasic carboxylic acids may be aliphatic, cycloaliphatic, aromatic, heterocyclic or ethylenically unsaturated and may carry halogen atoms as substituents.

Instead of the polybasic carboxylic acids, the anhydrides thereof may also be esterified. Examples of suitable polybasic starting carboxylic acids are succinic acid, adipic acid, sebacic acid, phthalic acid, isophthalic acid, trimellitic acid, phthalic anhydride, tetrahydrophthalic anhydride, hexahydrophthalic anhydride, tetrachlorophthalic anhydride, endomethylenetetrahydrophthalic anhydride, glutaric anhydride, maleic acid, maleic anhydride and fumaric acid. Examples of polyhydric alcohols to be used in excess are 1,2-ethanediol, 1,2-propanediol, 1,3-propanediol, 1,2-butanediol, 1,3-butanediol, 1,4-butanediol, 1,4-butenediol, 1,4-butynediol, 1,5-pentanediol and its positional isomers, 1,6-hexanediol, 1,8-octanediol, 1,4-bishydroxymethylcyclohexane, 2,2-bis-(4-hydroxycyclohexyl)propane, 2-methyl-1,3-propanediol, glycerol, trimethylolpropane, trimethylolethane, 1,2,6-hexanetriol, 1,2,4-butanetriol, diethylene glycol, triethylene glycol, tetraethylene glycol, polyethylene glycol, dipropylene glycol, polypropylene glycol, dibutylene glycol and polybutylene glycol. Polyesterpolyols obtained from diols and dicarboxylic acids are preferred.

Other suitable polyesterpolyols are the adducts of lactones or lactone mixtures with dihydric alcohols used as initiator molecules. Examples of preferred lactones are ε-caprolactone, β-propiolactone, γ-butyrolactone and methyl-ε-caprolactone. Particularly suitable initiator molecules are the low molecular weight dihydric alcohols already stated as components for the polyesterpolyols.

Low molecular weight polyesterdiols or polyetherdiols can also be used as initiators for the preparation of the lactone adducts. Polyesters of hydroxycarboxylic acids are of course also suitable as monomers Ac. Polycarbonates, as obtainable, for example, from phosgene or diphenyl carbonate and the low molecular weight dihydric alcohols stated as components for the polyesterpolyols, in excess, are other monomers Ac suitable as polyesters. Suitable monomers Ac which are useful as polyesterpolyols are preferably polyetherdiols, as obtainable, for example, by boron trifluoride-catalyzed combination of ethylene oxide, propylene oxide, butylene oxide, tetrahydrofuran, styrene oxide or epichlorohydrin with themselves or with one another or by an addition reaction of these compounds, individually or as a mixture, with initiator components having reactive hydrogen atoms, such as water, polyhydric alcohols or a mines, such as 1,2-ethanediol, 1,3-propanediol, 1,2- or 2,2-bis-(4-hydroxyphenyl)-propane or aniline. Polyether-1,3-diols, for example trimethylolpropane which is alkoxylated at an OH group and whose alkylene oxide chain is terminated with an alkyl radical of 1 to 18 carbon atoms, are also preferably used monomers Ac. Monohydric alcohols are preferably used only in minor amounts as monomers Ac. In principle, the same types of compounds as those stated in connection with the polyhydric alcohols are suitable.

Suitable monomers Ad include the low molecular weight polyols and polyhydric alcohols stated as components for the polyesterpolyols Ac, eg. pentaerythritol or sorbitol. Linear 1-ω-dihydroxyalkanes, such as 1,3-propanediol, 1,4-butanediol and 1,6-hexanediol, are preferred. As in the case of the monomers Ac, here too diols are preferred. Other suitable monomers Ad are polyamines (preferably diamines), such as 1,2-diaminoethane, 1,6-diaminohexane, piperazine, 2,5-dimethylpiperazine, 1-amino-3-aminomethyl-3,5,5-trimethylcyclohexane (isophoronediamine), 4,4'-di-(aminocyclohexyl)-methane, 1,4-diaminocyclohexane, 1,2- and 1,3-diaminopropane, hydrazine, hydrazine hydrate, triamines, such as diethylenetriamine, or tetramines, such as N,N'-bis-(3-aminopropyl)-1,4-diaminobutane. However, other suitable monomers Ad are kerimines, as described in DE-B 27 25 589, ketazines, such as those of DE-B 28 11 148 and U.S. Pat. No. 4,269,748, amine salts, such as those in U.S. Pat. No. 4,292,226, or oxazolidines, as described in DE-B 27 32 131 and U.S. Pat. No. 4,192,937. These are masked polyamines from which the corresponding polyamines are liberated as intermediates in the presence of water. Aminoalcohols, such as ethanolamine, isopropanolamine, methylethanolamine and aminoethoxyethanol, are also suitable monomers Ad.

Further examples of monomers Aa to Ad suitable for producing the polyurethanes A are described in, for example, High Polymers, Vol. XVI, Polyurethanes, Chemistry and Technology, Interscience Publishers, New York, Vol. I, 1962, pages 32 to 42 and 44 to 54, and Vol. II, 1964, pages 5 to 6 and 198 to 199. Chain extension with H$_2$O is also possible.

The amounts of the monomers Ac and Ad are advantageously such that the molar ratio of their alcoholic groups, thiolic SH groups and/or

groups reactive with isocyanate (Ad:Ac) is 0–10, preferably 1–5.

In general, the amount of the monomers Ab to Ad is preferably chosen so that the sum of the alcoholic —OH groups, thiolic —SH groups and/or

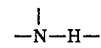

groups reactive toward isocyanate (among which the alcoholic —OH groups and

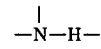

groups are preferred) is 0.9–1.3, particularly preferably 0.95–1.1, based on one isocyanate group. The number of functional groups reactive toward isocyanate very particularly preferably corresponds to the number of isocyanate groups.

As a rule, apart from those which are insoluble in DMF, the polyurethanes present in the novel aqueous polyurethane dispersions have a K value of from 20 to 80 in N,N-dimethylformamide (DMF). The K value is a relative viscosity number which is determined similarly to DIN 53,726 at 25° C. It expresses the flow rate of a 1% strength by weight solution of the polyurethane in DMF relative to the flow rate of pure DMF and characterizes the average molecular weight of the polyurethane.

At this point, it is once again mentioned that, for dispersing the polyurethane A, external dispersants, for example nonionic emulsifiers, such as polyether-alcohols having a relative molecular weight of from 500 to 10,000, preferably from 1,000 to 5,000, may be present. However, their presence is not essential, owing to the internal negative charges of the polyurethane.

For the preparation of the polyurethane A, the monomers Aa to Ad may be reacted in a low-boiling, water-miscible solvent or in the absence of a solvent, in a known manner, as also described in DE-A 34 37 918.

The solvents used may be any solvents which are unreactive toward isocyanates. Those which are infinitely miscible with water, for example tetrahydrofuran, methyl ethyl ketone, N-methylpyrrolidone and in particular acetone, are particularly preferred. High-boiling water-miscible solvents, eg. N-methylpyrrolidone or dimethylformamide, are less preferable. Water-immiscible solvents, such as toluene or xylene, may also be present in minor amounts in solvent mixtures. The boiling point of the solvent is preferably below 100° C.

The reaction temperature is from 20° to 160° C., preferably from 50° to 120° C. As a rule, the reaction time is from 2 to 10 hours.

The reaction can be accelerated by the presence of conventional catalytic substances, such as dibutyltin dilaurate, tin(II) octoats or 1,4-diazabicyclo[2.2.2]-octane, usually in amounts of from 10 to 1,000 ppm, based on the reaction mixture.

Thereafter, dilution may be effected with a water-miscible solvent, anionic groups of the monomers Ab may be ionized by neutralization and water may be added.

Any organic solvents present are then usually removed to the desired extent, in general completely, by distillation, and it is for this reason that solvents whose boiling point is below the boiling point of water are preferred.

The added amount of water is usually such that the desired solids content of the aqueous polyurethane dispersion results.

The polyurethane A can, however, also be prepared by first preparing a polyurethane prepolymer in an organic solvent. As a rule, this is done by reacting the monomers Aa, Ab and Ac and some or all of the monomers Ad with one another. Thereafter, the reaction mixture, which contains the polyurethane prepolymer still having isocyanate groups, is dispersed with the addition of water. The further reaction, in particular with the remaining monomers Ad, can then be carried out. The organic solvent is then removed, as described above.

The novel aqueous polyurethane dispersions are obtainable from the aqueous polyurethane dispersions which can be prepared as described above and contain only the component A, for example by adding to them effective amounts of at least one polymer B, if necessary at elevated temperatures, and bringing the pH to the required value. Alkali metal hydroxides, ammonia and/or organic amines are preferably used for establishing the pH. Novel aqueous polyurethane dispersions which contain no polyvalent metal ions are preferred.

Useful monomers Ba are in particular unsaturated carboxylic, sulfonic and phosphonic acids. Particularly preferred monomers Ba are vinylsulfonic acid, vinyl-phosphonic acid and $\alpha,\beta$-monoethylenically unsaturated carboxylic acids of 3 to 6 carbon atoms. Among the latter, acrylic acid and methacrylic acid are particularly advantageous. The monomers Ba can of course also first be polymerized in the form of their anhydrides and subsequently partially or completely hydrolyzed. The preferred anhydride is, for example, maleic anhydride.

Particularly suitable monomers Bb are monoethylenically unsaturated monomers, such as esters of $\alpha,\beta$-monoethylenically unsaturated carboxylic acids of 3 to 6 carbon atoms and $C_1$-$C_{12}$-alkanols, vinylaromatic monomers, amides of $\alpha,\beta$-monoethylenically unsaturated carboxylic acids of 3 to 6 carbon atoms and the nitriles of these acids. Other suitable monomers Bb are esters of vinyl alcohol and $C_1$-$C_{12}$-alkanecarboxylic acids. Unsaturated hydrocarbons, such as butadiene, propene or ethene, are also suitable. The esters of acrylic and methacrylic acid, such as n-butyl acrylate, methyl methacrylate, ethyl acrylate, 2-ethylhexyl acrylate and tert-butyl acrylate, are particularly preferred. Further examples are acrylamide, methacrylamide, acrylonitrile, methacrylonitrile, styrene, vinyltoluene, vinyl acetate, vinyl propionate and vinyl laurate.

The component B preferably contains from 50 to 100% by weight of monomers Ba as polymerized units. The amount of monomers Ba is particularly preferably from 75 to 100% by weight, and the component B very particularly preferably consists exclusively of monomers Ba in polymerized form. Advantageous polymers B are those which contain, in polymerized form, a) from 50 to 100% by weight of acrylic acid, methacrylic acid and/or maleic anhydride and
b) from 0 to 50% by weight of styrene.

The component B is advantageously present in dissolved form in the novel aqueous polyurethane dispersions at 25° C., ie. B preferably contains no crosslinking components, since crosslinked polymers B are not capable of forming true solutions in an aqueous medium.

Other preferred polymers B are those which, when added to water in an amount of 100 g/kg of water at 25° C., reduce the pH of the aqueous medium to below 6.

Furthermore, the solubility of component B at 25° C. in water is advantageously at least 100 g/kg of water, at least where the pH of the mixture is increased to a pH of $\geq 6$ by the addition of sodium hydroxide. Preferably, the solubility for this case is at least 200, particularly preferably at least 300, g/kg of water. An essential property of such a solution is that its light transmittance in the undiluted state for a path length of 2.5 cm at room temperature is essentially 100%, relative to water.

The flow resistance-reducing effect of the component B depends both on the polyurethane content of the aqueous polyurethane dispersion and on the added amount of B.

As a rule, the polymer B is added to the novel aqueous polyurethane dispersion in an amount of from 0.01 to 5, preferably from 0.1 to 1, % by weight, based on the weight of the polyurethane. While the performance characteristics of the aqueous polyurethane dispersion are not substantially adversely affected by the addition of the polymer B, the flow is considerably increased. This is true regardless of the shear gradient. At the same time, the rheological behavior of the aqueous polyurethane dispersion approaches that of a Newtonian fluid. The polymers B are obtainable in a conventional manner, for example by free radical polymerization in aqueous or organic solution (eg. xylene or isopropanol) or in the absence of a solvent. An organic solution is employed in particular when monomers Bb are also polymerized. If the polymerization is carried out in organic solution, the latter is added after completion of polymerization in water, and the organic solvent is removed by distillation, giving an aqueous solution of the polymer.

The polymerization temperature is usually from 25° to 150° C. In order to be able to regulate the molecular weight of the polymer B, molecular weight regulators such as thiols, eg. mercaptoethanol, are usually used. Suitable polymerization initiators are all those which are capable of initiating free radical polymerization reactions in the stated temperature range and are soluble either in water or in the selected organic solvent or in the monomers. Examples are azo compounds and peroxides, such as $H_2O_2$ or alkali metal peroxydisulfates. Polymers B are of course generally commercially available.

The novel flow-improving effect occurs even when the novel aqueous polyurethane dispersions contain, as further component C, at least one adhesion-improving polymer. The amount by weight of this adhesion-improving agent may be from 5 to 60, preferably from 5 to 30, % by weight, based on the disperse polyurethane. Such adhesion-improving additives are present in particular when the novel aqueous polyurethane dispersion is to be used as an adhesive. Suitable adhesion-improving additives are all those mentioned as such in the prior Applications DE-A 43 14 237 (O.Z. 0050/44008), DE-A 41 37 661 (O.Z. 0050/42811) and DE-A 43 14 236 (O.Z. 0050/44009). The adhesion-improving polymer, like the component B, can be added to the polyurethane before or during the polyaddition reaction for the preparation of the polyurethane or after completion of said reaction. It is of course also possible for the additives to be added to the aqueous dispersion of the polyurethane. They can be added as such or as solutions.

Among the wide range of polycondensates, free radical polymers or polyadducts possible as adhesion improvers, a few preferred types may be mentioned below by way of example.

The adhesion-improving polymers are preferably condensation resins of aldehydes and/or ketones with phenols, in particular those having relative molecular weights (weight average $\overline{M}_w$) of from 500 to 2,000 and softening temperatures of from 80° to 130° C. The condensation resins are particularly preferably novolaks, as obtainable by acid-catalyzed reaction of phenols, in particular phenol or $C_1$-$C_{10}$-alkyl-substituted phenols, with aliphatic aldehydes and/or ketones, such as n-butyraldehyde, isobutyraldehyde, n-propionaldehyde, acetone, acetaldehyde or formaldehyde.

In particular, from 1.05 to 1.3 mol of phenols are used per mol of aldehyde and/or ketone in the reaction.

Epoxy resins, preferably reaction products of epoxides, such as epichlorohydrin, with bisphenol A are particularly suitable; those having molecular weights (weight average $\overline{M}_w$) of from 500 to 5,000 and softening temperatures of from 80° to 130° C. are preferred.

Other suitable adhesion-improving polymers are polyvinyl acetate, polyvinyl chloride, polymethyl methacrylate, polyamides, polyethers, polyesters, polyetherdiols, polyesterdiols, polyurethanes, in particular polyurethanes free of salt groups, and phenacrylate.

Preferred polyvinyl acetates are the homopolymers of vinyl acetate. Its copolymers which contain up to 10% by weight of comonomers, such as vinyl laurate, vinyl stearate or, preferably, (meth)acrylates, fumarates or maleates of $C_1$-$C_8$-alkanols, such as methanol, n-butanol or 2-ethylhexanol, may also be used. The polymers usually have a K value of from 45 to 60, measured at 25° C. in cyclohexanone according to DIN 53,726. Polarvinyl chloride is generally understood as meaning the homopolymers of vinyl chloride and its copolymers which contain up to 10% by weight of comonomers such as ethylene or vinyl acetate. Their K value (25° C., cyclohexanone, DIN 53,726) should be from 45 to 55. Polymethacrylate used by the skilled worker usually comprises homopolymers of methyl acrylate or its copolymers with up to 10% by weight, based on the copolymer, of vinyl acetate, acrylates of $C_1$-$C_8$-alkanols or methacrylates of $C_2$-$C_8$-alkanols. Their melt flow index MFI is in general from 0.1 to 3.0, determined according to DIN 53,735 (230° C./3.8 kg). These polymers are generally prepared by free radical polymerization of the ethylenically unsaturated monomers at from 30° to 150° C. by mass, solution or emulsion polymerization, with subsequent drying. Such polymers are generally known, for example from Houben-Weyl, Methoden der organischen Chemie, Volume E20, 1987, pages 1115–1125, 1041–1062 and 1141–1174.

Suitable polyamides have a K value of from 65 to 80, measured in $H_2SO_4$ at 25° C. according to DIN 53,727. They are usually polymers which are derived from lactams having 7 to 13 ring members, such as ε-caprolactam, ε-capryllactam or ε-laurolactam, for example polycaprolactam (PA6), and polyamides which are obtained by reacting dicarboxylic acids with diamines. Examples of these are polyhexamethylene adipamide (PA66), polyhexamethylenesebacamide (PA610) or polyhexamethylenedodecanamide (PA612). Examples of suitable dicarboxylic acids are alkanedicarboxylic acids of 4 to 12, in particular 6 to 10, carbon atoms and phthalic acid, terephthalic acid and isophthalic acid and any mixtures of these acids. Examples of diamines are alkanediamines of 4 to 12, in particular 4 to 8, carbon atoms, as well as m-xylylenediamine, p-xylylenediamine, the hydrogenated derivatives thereof, bis-(4-aminophenyl)-methane, bis-(4-aminocyclohexyl)-methane and 2,2-bis-(4-aminophenyl)-propane and mixtures thereof. Owing to the good solubility, copolymers are preferred, for example a copolyamide of from 30 to 40% by weight of adipic acid, from 15 to 20% by weight of hexamethylenediamine and from 30 to 35% by weight of ε-caprolactam or from 15 to 20% by weight of ε-aminocaproic acid. The preparation of these known polymers is generally known, cf. for example Römpp, Chemielexikon, 8th Edition, pages 2861, 3058 and 3267, or EP-A-129 195 and EP-A-129 196.

The polyetherdiols are known per se, for example from Kunststoff-Handbuch 7 (1983), pages 42–54. Examples are polyethylene oxide, polypropylene oxide or polytetrahydrofuran or their copolymers having two terminal hydroxyl groups. They are prepared in a known manner by, in general, anionic polyaddition, cf. for example N. G. Gaylord, High Polymers, Vol. 13, New York 1963, Part I. Polyetherols which are grafted with ethylene oxide to increase the reactivity are of minor importance. The polyetherdiols generally have a molecular weight of from 300 to 3,000, corresponding to a K value of from 25 to 60 in DMF at 25° C. according to DIN 53,726. Preferred molecular weights are from 800 to 2,200, corresponding to a K value of from 20 to 50.

For example, polyethylene oxide, polypropylene oxide or polytetrahydrofuran is used as the polyether. The polyethers usually have a K value of from 20 to 50 in DMF at 25° C. according to DIN 53,726. They are generally known, for example from Encyclopedia of Polymer Science and Technology 6 (1967), 103 et seq., 9 (1968), 668 et seq., and 13 (1970), 670 et seq.

Monomer-free unsaturated polyester resins are preferred polyesters. These are known condensates of polybasic, in particular dibasic, carboxylic acids and their esterifiable derivatives, in particular their anhydrides which are linked by an ester-like bond to polyhydric, in particular dihydric, alcohols and may contain additional radicals of monobasic carboxylic acids or monohydric alcohols. Examples of starting materials are maleic acid, fumaric acid, phthalic acid, isophthalic acid, terephthalic acid, maleic anhydride, phthalic anhydride, isophthalic anhydride, ethylene glycol, propylene glycol, 1,4-butanediol and neopentylglycol. Resins which are prepared by cocondensation of bisphenol A, epichlorohydrin/bisphenol A condensates and methacrylic acid are of minor importance for the purposes of the present invention. In this context, monomer-free means that these UP resins are not dissolved in monomers suitable for crosslinking, such as styrene. The products usually have a viscosity of from 1,000 to 6,000, in particular from 2,000 to 4,000, mPa.s at 150° C.

Suitable polyesterdiols are condensates which have two terminal OH groups and are obtained from dicarboxylic acids, such as adipic acid or isophthalic acid, with diols, for exhale 1,4-butanediol, 1,6-hexanediol or neopentylglycol.

The molecular weight range of the polyesterdiols used is in general from 300 to 5,000. A molecular weight of from 800 to 2,500, corresponding to a K value of from 30 to 55 in DMF at 25° C. according to DIN 53,276, is preferred. These polymers and their preparation are generally known from Kunststoff-Handbuch 7 (1983), 54–62, and DE 1 268 842.

Polyurethanes which are free of salt groups are known addition polymers based on polyetherdiols or polyesterdiols, isocyanates, such as hexamethylene diisocyanate or 2,4-diisocyanatodiphenylmethane, and possibly the di- or trifunctional chain extenders, which are prepared by conventional methods (Kunststoff-Handbuch, Karl-Hanser-Verlag, Volume 7 (1966)). Low molecular weight condensates (K value from 25 to 60 in DMF at 25° C. according to DIN 53,726) are preferably used. Crosslinked polyurethaneel are of minor importance.

Phenacrylates are preferably prepared by subjecting bisphenol A glycidyl ethers esterified with acrylic or methacrylic acid to an addition reaction with terephthalic acid. Phenacrylates based on epoxidized novolaks may also be used. The K values of the polymers are in general from 30 to 55 (in cyclohexane at 25° C. according to DIN 53,726).

The novel aqueous polyurethane dispersions described are particularly suitable as finishes, coating materials, binders or adhesives. Remarkably, the addition of the component B causes no substantial change in the LT value of the aqueous starting dispersion of the polyurethane A (determined at a polyurethane solids content of 0.01% by weight relative to water at a path length of 2.5 cm and at 25° C.).

EXAMPLES

The symbols used in the Examples below have the meanings stated below:
TDI=Toluylene diisocyanate
HDI=Hexamethylene diisocyanate
DBTL=Dibutyltin dilaurate
PUD=40% strength by weight aqueous solution of the sodium salt of the Michael adduct of acrylic acid and ethylenediamine
DMPA=Dimethylolpropionic acid
IPDI=Isophorone diisocyanate
DMEA=Dimethylethanolamine
DETA=Diethylenetriamine
NPG=Neopentylglycol Component B1: 45% strength by weight aqueous solution of the sodium salt of a polyacrylic acid whose $\overline{M}_n$ is 2,750 and whose $\overline{M}_w$ is 9,000.

Component B2: Copolymer of styrene and acrylic acid having an acid number, according to DIN 53,402, of from 260 to 280 and an $\overline{M}_n$ of 3,000 and an $\overline{M}_w$ of 6,500.

Component B3: Soromin® SM, a 30% strength by weight aqueous solution of a copolymer of styrene and maleic anhydride, whose pH is brought to 8.7 by the addition of a base.

Unless stated otherwise, the dynamic viscosities η of the Examples below were determined at a shear rate of 279 s$^{-1}$ using a rotational rheometer with concentric cylinders (spindle diameter: 38.7 mm, cup diameter: 42.0 mm) at 25° C.

1. Preparation of conventional aqueous polyurethane dispersions KPUD1 to KPUD4

KPUD1: A mixture of 596.6 g of polypropylene oxide diol (hydroxyl number according to DIN 53,240=56), 21.5 g of DMPA and 31.0 g of NPG was reacted with 150.9 g of TDI in the presence of 0.5 g of DBTL at 108° C. in the course of 4 hours. After dilution of the reaction mixture with 978 g of acetone, the content of remaining free NCO groups was 0.4% by weight, based on the dilute reaction mixture. The mixture was then neutralized at 55° C. with a solution of 4.5 g of sodium hydroxide in 20 g of water. Thereafter, 1,200 g of water were added at 50° C. and the acetone was then distilled off at 100 mbar and 43° C.

The resulting aqueous polyurethane dispersion KPUD1 was brought to a solids content of 40% by weight. It was characterized at 25° C. as follows:
pH: 8.1
LT: 83.7%
η: 872 mPa.s KPUD2: A mixture of 266.91 g of a dried polyester of adipic acid and butanediol (hydroxyl number according to DIN 53,240=47.1), 0.38 g of a 10% strength by weight solution of DBTL in toluene, 71.8 g of acetone and 13.71 g of TDI was kept at 65° C. for 1 hour. 13.24 g of HDI were then added and the mixture was again kept at 65° C. for 1 hour. After dilution with 287 g of acetone, the content of the remaining free NCO groups was 0.63% by weight, based on the dilute reaction mixture. Chain extension was then effected with 15.36 g of PUD at 51° C., after which 300 g of water were added at 50° C., the acetone was distilled off and the resulting aqueous polyurethane dispersion KPUD2 was brought to a solids content of 50% by weight. It was characterized at 25° C. as follows:
pH: 8.3
LT: 72%
η: 114 mPa.s KPUD3: A mixture of 388 g of a dried polyester of a mixture comprising adipic acid and isophthalic acid in a molar ratio of 1:1 and 1,6-hexanediol, 24.5 g of DMPA, 54.1 g of 1,4-butanediol and 254.8 g of IPDI, in 130 g of methyl ethyl ketone, was reacted at 92° C. in the course of 5 hours. After dilution of the reaction mixture with 500 g of acetone, the content of the remaining free NCO groups was 0.88% by weight, based on the dilute reaction mixture. Thereafter, neutralization was effected with 19.6 g of DMEA and dispersing was carried out with 1,200 g of water. Immediately thereafter, the mixture was reacted with 8.6 g of DETA dissolved in 50 g of water, and the solvent was distilled off. The resulting aqueous polyurethane dispersion KPUD3 was brought to a solids content of 34.6% by weight. It was characterized at 25° C. as follows:
pH: 9.0
LT: 98%
η: 400 mPa.s KPUD4: A mixture of 401 g of polypropylene glycol (hydroxyl number according to DIN 53,249=54), 0.5 g of DBTL, 21.4 g of DMPA, 20.11 g of neopentylglycol and 117.4 g of TDI was reacted at 105° C. in the course of 4 hours and then diluted with 684.4 g of acetone. The content of remaining free NCO groups was 0.68% by weight, based on the dilute reaction mixture. Thereafter, the mixture was neutralized at 55° C. with a solution of 4.46 g of sodium hydroxide in 30 g of water, after which a solution of 240 g of a phenol/aldehyde resin in 240 g of acetone was added. 1,200 g of water were then added at 50° C. for dispersing, the acetone was removed by distillation and the resulting aqueous polyurethane dispersion KPUD4 was brought to a solids content of 40% by weight. It was characterized at 25° C. as follows:
pH: 7.7
LT: 60%
η: 124 mPa.s 2. Novel aqueous polyurethane dispersions EPUD1 to EPUD7

EPUD1: As for KPUD4, except that a mixture of 2.25 g of component B2, 0.6 g of potassium hydroxide and 30 g of water was added before the removal of the acetone by distillation.

The solids content of the resulting aqueous polyurethane dispersion EPUD1 was adjusted so that the amount of polyurethane and of dispersing water contained corresponded to the values of KPUD4. The polyurethane dispersion was characterized at 25° C. as follows:
pH: 7.8
LT: 88%
η: 34 mPa.s EPUD2: As for KPUD4, except that a solution of 5 g of component B1 in 10 g of water was added before the removal of the acetone by distillation.

The solids content of the resulting aqueous polyurethane dispersion EPUD2 was adjusted so that the amount of polyurethane and of dispersing water contained corresponded to the values of KPUD4. The polyurethane dispersion was characterized at 25° C. as follows:
pH: 8.0
LT: 62%
η: 41.7 mPa.s EPUD3: As for KPUD2, except that a solution of 4 g of component B1 in 20 g of water was added before the removal of the acetone by distillation. The solids content of the resulting aqueous polyurethane dispersion EPUD3 was adjusted so that the amount of polyurethane and of dispersing water contained corresponded to the values of KPUD2. The polyurethane dispersion was characterized at 25° C. as follows:
pH: 8.3
LT: 69%
η: 98.3 mPa.s EPUD4: As for KPUD1, except that a solution of 5 g of component B1 in 20 g of water was added before the removal of the acetone by distillation. The solids content of the resulting aqueous polyurethane dispersion EPUD4 was adjusted so that: the amount of polyurethane and of dispersing water contained corresponded to the values of KPUD1. The polyurethane dispersion was characterized at 25° C. as follows:
pH: 8.2
LT: 86%
η: 74 mPa.s EPUD5: As for EPUD4, except that a solution of 10 g of component B1 in 20 g of water was added. The polyurethane dispersion was characterized at 25° C. as follows:
pH: 8.3
LT: 87%
η: 45 mPa.s EPUD6: As for KPUD3, except that the resulting polyurethane dispersion additionally contained 0.23% by weight, based on the polyurethane, of component B1 (solid). It was characterized at 25° C. as follows:
pH: 9.0
LT: 98%
η: 129 mPa.s EPUD7: As for KPUD1, except that a solution of 7.5 g of component B3 in 15 g of water was added before the removal of the acetone by distillation. The solids content of the resulting aqueous polyurethane dispersion EPUD7 was adjusted so that the amount of polyurethane and of dispersing water contained corresponded to the values of KPUD1. The polyurethane dispersion was characterized at 25° C. as follows:
pH: 8.3
LT: 77%
η: 128 mPa.s 3. Investigation of the flow resistance at variable shear rate a) A mixture of 32 kg of Lupranol® 1000 (polypropylene glycol having a number average relative molecular weight of 2,000), 2.58 kg of DMPA, 4.0 kg of acetone and 6.128 kg of TDI was reacted with 24 ml of DBTL at 107° C. under a slight pressure of 1.5 bar in the course of 6 hours. After dilution with 32 kg of acetone, the content of the remaining free NCO groups was 0.04% by weight, based on the dilute reaction mixture. Thereafter, neutralization was effected with 0.8 kg of triethylamine and dispersing was carried out with 48 kg of water. The acetone was then removed by distillation under reduced pressure and the resulting aqueous polyurethane dispersion KPUD5 was brought to a solids content of 43.8% by weight. It was characterized at 25° C. as follows:
pH: 6.7
LT: 88% b) EPUD7 and EPUD8 corresponded to KPUD5 but additionally contained, respectively, 0.4 and 1.0% by weight, based on the disperse polyurethane, of component B1 (solid).

Table I below shows the dynamic viscosities of KPUD5, EPUD7 and EPUD8, determined at 25° C. at various shear rates.

TABLE I

| Shear rate (s⁻) | η KPUD5 | η EPUD7 | η EPUD8 (mPa · s) |
|---|---|---|---|
| 4.46 | 451.4 | — | — |
| 7.85 | 434.7 | — | — |
| 14.2 | — | 75.7 | — |
| 15.19 | 383.1 | — | — |
| 18.96 | — | 67.1 | 55.6 |
| 19.99 | 357.5 | — | — |
| 24.9 | — | 63.9 | 54.6 |
| 26.7 | 328.9 | — | — |
| 32.9 | — | 62.1 | 55.1 |
| 35.2 | 302.7 | — | — |
| 47.4 | — | 60.5 | 54.1 |
| 51.1 | 264.6 | — | — |
| 63.7 | — | 59.6 | 53.4 |
| 68.6 | 236.5 | — | — |
| 83 | — | 58.6 | 53.5 |
| 90.2 | 210.2 | — | — |
| 111.7 | — | 57.5 | 52.9 |
| 120.4 | 185.2 | — | — |
| 147.4 | — | 56.4 | 52.3 |
| 158.8 | 163.6 | — | — |
| 214 | — | 54.4 | 51.2 |
| 287 | — | 51.8 | 50.2 |

4. Performance characteristics of conventional and novel aqueous polyurethane dispersions (contact adhesion after heat activation)

Before the application, 7.5% by weight, based on the disperse polyurethane, of a water-emulsifiable polyisocyanate were added to the aqueous polyurethane dispersions.

Peel strength:

The dispersions were applied uniformly with a brush (1 inch, fine bristles) to styrene/butadiene rubber (SBR1 rubber having a Shore A hardness of 90 (cf. DIN 16,909)) over an area of 30×130 mm² and were dried for 45 minutes at room temperature. After the adhesive films had been heated once by IR radiation to 80° C. in the course of about 5 seconds (flash activation), the samples were pressed for 10 seconds at 0.5 N/mm². The peel strength was measured immediately (instantaneous strength) and after storage for 5 days in a conditioning room (23° C./50% relative humidity) (final strength), according to DIN 52,273.

Heat resistance:

The test specimens were produced as for the peel strength test. After heating for 1 hour at 50° C., they were each loaded at 50° C. for 10 minutes with 5, 10, 15, 20, 25 and 30 N in ascending order. If the adhesive bond held, the load was removed from the sample, and the latter was heated for 30 minutes at 60° C. and tested again in 10 minute steps up to a maximum of 30 N. In the same way, the test temperature was increased by 10° C. after each cycle. The temperature (° C.) and the load (N) at which opening of the adhesive bond of more than 50 mm was detectable are stated in each case.

Table II shows the results obtained as a function of the polyurethane dispersion used.

TABLE II

| | Instantaneous strength [N/mm²] | Final strength [N/mm²] | Heat resistance [°C./N] |
|---|---|---|---|
| KPUD1 | 1.1 | 5.5 | 80/25 |
| EPUD4 | 1.0 | 6.0 | 80/25 |
| KPUD2 | 1.1 | 3.6 | 70/20 |
| EPUD3 | 1.2 | 3.1 | 70/25 |

We claim:

1. An aqueous polyurethane dispersion containing

A) at least one polyurethane (component A) dispersed in an aqueous medium and having negatively charged groups at a pH of the aqueous dispersing medium of ≧6, as the main component, and B) 0.1 to 5.0% by weight, based on component A, of at least one polymer (component B) which comprises, in polymerized form,
   a) from 25 to 100% by weight of at least one unsaturated monomer which has at least one Brönsted acid group (monomers Ba) and
   b) from 0 to 75% by weight of one or more monomers capable of undergoing free radical copolymerization (monomers Bb),
   with the proviso that component B has a number average molecular weight of from 1,000 to 50,000, component B acts as a Brönsted acid when added to water at 25° C., the aqueous dispersing medium of the aqueous polyurethane dispersion has a pH of ≧6 at 25° C. and wherein the aqueous polyurethane dispersion contains no polyvalent metal ions.

2. An aqueous polyurethane dispersion as claimed in claim 1, whose content of A is from 20 to 80% by weight, based on the dispersion.

3. An aqueous polyurethane dispersion as claimed in claim 1, whose aqueous dispersing medium has a pH of from 6 to 11 at 25° C.

4. An aqueous polyurethane dispersion as claimed in claim 1, whose component B contains from 50 to 100% by weight of monomers Ba as polymerized units.

5. An aqueous polyurethane dispersion as claimed in claim 1, whose component B contains, in polymerized form,
   a) from 50 to 100% by weight of acrylic acid, methacrylic acid or maleic anhydride and
   b) from 0 to 50% by weight of styrene.

6. An aqueous polyurethane dispersion as claimed in claim 1, containing from 0.05 to 5% by weight, based on component A, of component B.

7. An aqueous polyurethane dispersion as claimed in claim 1, containing, as further component C, an adhesion-improving polymer.

8. A process for the preparation of an aqueous polyurethane dispersion as claimed in claim 1, wherein an aqueous polyurethane dispersion containing the polyurethane A is first prepared and the polymer B and, if required, effective amounts of a base are then added to said polyurethane dispersion to control the pH of the dispersion.

9. A finish, coating material, a binder or an adhesive comprising the aqueous polyurethane dispersion of claim 1.

10. An aqueous polyurethane dispersion as claimed in claim 1, whose component A essentially comprises
   a) at least one organic diisocyanate or at least one mixture of organic isocyanates which has an arithmetic mean NCO functionality of from 1.9 to 2.3 (monomers Aa),
   b) at least one compound which has at least one anionic group and furthermore possesses at least one alcoholic OH group or thiolic SH group or

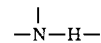

group or a mixture of these groups (monomers Ab),
   c) at least one dihydric alcohol which differs from the monomers Ab and has a number average molecular weight of from more than 500 to 5,000 or at least one mixture of alcohols differing from the monomers Ab, which mixture has an arithmetic mean functionality of from 1.5 to 2.5, based on alcoholic OH groups, and possesses a number average molecular weight of from more than 500 to 5,000 (monomers Ac) and, if desired,
   d) one or more compounds which differ from the monomers Ab and have two functional groups selected from the group consisting of the alcoholic OH group, the thiolic SH group and the

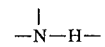

group and possess a number average molecular weight of from 60 to 500, or, if desired, a mixture of compounds differing from the monomers Ab, which mixture has an arithmetic mean functionality of from 1.5 to 2.5, based on functional groups selected from the group consisting of the alcoholic OH group, the thiolic SH group and the

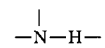

group, and possesses a number average molecular weight of from 60 to 500 (monomers Ad).

* * * * *